US011262306B2

(12) United States Patent
Gao

(10) Patent No.: US 11,262,306 B2
(45) Date of Patent: Mar. 1, 2022

(54) METHOD TO KEEP THE EXCITATION LIGHT SHEET IN FOCUS IN SELECTIVE PLANE ILLUMINATION MICROSCOPY

(71) Applicant: INTELLIGENT IMAGING INNOVATIONS, INC., Denver, CO (US)

(72) Inventor: Liang Gao, Denver, CO (US)

(73) Assignee: INTELLIGENT IMAGING INNOVATIONS, INC., Denver, CO (US)

( * ) Notice: Subject to any disclaimer, the term of this patent is extended or adjusted under 35 U.S.C. 154(b) by 275 days.

(21) Appl. No.: 16/607,317

(22) PCT Filed: May 4, 2018

(86) PCT No.: PCT/US2018/031132
§ 371 (c)(1),
(2) Date: Oct. 22, 2019

(87) PCT Pub. No.: WO2018/204814
PCT Pub. Date: Nov. 8, 2018

(65) Prior Publication Data
US 2020/0340921 A1 Oct. 29, 2020

Related U.S. Application Data

(60) Provisional application No. 62/501,423, filed on May 4, 2017.

(51) Int. Cl.
*G02B 21/06* (2006.01)
*G01N 21/64* (2006.01)
(Continued)

(52) U.S. Cl.
CPC ....... *G01N 21/6458* (2013.01); *G02B 21/244* (2013.01); *G02B 21/367* (2013.01)

(58) Field of Classification Search
CPC .......... G01N 21/6458; G01N 21/6456; G02B 21/244; G02B 21/367; G02B 21/00;
(Continued)

(56) References Cited

U.S. PATENT DOCUMENTS

2012/0098951 A1* 4/2012 Borovytsky ........... G02B 21/06
348/79
2012/0140243 A1* 6/2012 Colonna de Lega ........................
A61F 9/00836
356/609

(Continued)

FOREIGN PATENT DOCUMENTS

DE 102007017598 A1 10/2008
WO WO 2015/184124 12/2015

OTHER PUBLICATIONS

Oliva, Michael A. et al. "Filtering Out Contrast Reversals for Microscopy Autofocus" Applied Optics; Vo. 38, Issue 4, pp. 638-646; Feb. 1999.

(Continued)

*Primary Examiner* — Arnel C Lavarias
(74) *Attorney, Agent, or Firm* — Jason H. Vick; Sheridan Ross, PC

(57) ABSTRACT

Keeping the excitation light sheet in focus is critical in selective plane illumination microscopy (SPIM) to ensure its 3D imaging ability. Unfortunately, an effective method that can be used in SPIM on general biological specimens to find the axial position of the excitation light sheet and keep it in focus is barely available. Here, we present a method to solve the problem. We investigate its mechanism and demonstrate its performance on a lattice light sheet microscope.

20 Claims, 5 Drawing Sheets

(51) Int. Cl.
    G02B 21/24    (2006.01)
    G02B 21/36    (2006.01)
(58) Field of Classification Search
    CPC .............. G02B 21/0004; G02B 21/002; G02B
        21/0024; G02B 21/0032; G02B 21/0052;
            G02B 21/006; G02B 21/0072; G02B
            21/0076; G02B 21/06; G02B 21/36;
                                    G02B 21/361
    USPC ......... 359/385.362, 363, 368, 369, 388, 390
    See application file for complete search history.

(56)                References Cited

U.S. PATENT DOCUMENTS

2013/0094755 A1    4/2013  Lippert et al.
2015/0211997 A1*   7/2015  Dake .................... G02F 1/21
                                                   250/550

OTHER PUBLICATIONS

Sun, Yu et al., "Autofocusing in Computer Microscopy: Selecting the Optimal Focus Algorithm" Microscopy Research and Technique; 65:139-149; Oct. 2004.
International Preliminary Report on Patentability for International Application No. PCT/US2018/031132, dated Nov. 14, 2019.
Chen, Bi-Chang et al., "Lattice Light-Sheet Microscopy: Imaging Molecules to Embryos at High Spatiotemporal Resolution" SCIENCE Magazine; vol. 346, Issue 6208; Oct. 24, 2014.
Gao, Liang et al. "3D Live Fluorescence Imaging of Cellular Dynamics Using Bessel Beam Plane Illumination Microscopy" Nature Protocols; vol. 9, No. 5; Apr. 10, 2014.
Gao, Liang et al., "Noninvasive Imaging Beyond the Diffraction Limit of 3D Dynamics in Thickly Fluorescent Specimens" Cell 151, 1370-1385; Dec. 7, 2012.
Gao, Liang "Optimization of the Excitation Light Sheet in Selective Plane Illumination Microscopy" Optical Society of America; 2015.
Huisken, Jan et al. "Optical Sectioning Deep Inside Live Embryos by Selective Plane Illumination Microscopy" SCIENCE Mag; vol. 305; Aug. 13, 2004.
Keller, Philip J. et al., "Fast, High-Contrast Imaging of Animal Development with Scanned Light Sheet-Based Structured-Illumination Microscopy" Nature Methods; Jul. 4, 2010.
Keller, Philip J. et al., "Reconstruction of Zebrafish Early Embryonic Development by Scanned Light Sheet Microscopy" SCIENCE Mag.; vol. 322; Nov. 14, 2008.
Liu, X.Y. et al. "Dynamic Evaluation of Autofocusing for Automated Microscopic Analysis of Blood Smear and Pap Smear" Journal of Microscopy; vol. 227, Pt 1, Aug. 2007.
Planchon, Thomas A. et al. "Rapid Three-Dimensional Isotropic Imaging of Living Cells Using Bessel Beam Plane Illumination" Nature Methods, vol. 8, No. 5; May 2011.
Royer, Loïc A., et al., "Adaptive Light-Sheet Microscopy for Long-Term, High Resolution Imaging in Living Organisms" Nature Biotechnology; Oct. 31, 2016.
Wu, Yicong et al., "Inverted Selective Plane Illumination Microscopy (iSPIM) Enables Coupled Cell Identity Lineaging and Neurodevelopmental Imaging in Caenorhabditis elegans" PNAS; vol. 108, No. 43; Oct. 25, 2011.
Yazdanfar, Siavash et al., "Simple and Robust Image-Based Autofocusing for Digital Microscopy" Optics Express, vol. 16, No. 12; Jun. 9, 2008.
International Search Report for International Application No. PCT/US2018/031132, dated Jul. 25, 2018.
Written Opinion for International Application No. PCT/US2018/031132, dated Jul. 25, 2018.
Office Action for European Application No. 18727503.7, dated Dec. 15, 2021.

* cited by examiner

METHOD TO KEEP THE EXCITATION LIGHT SHEET IN FOCUS IN SELECTIVE PLANE ILLUMINATION MICROSCOPY

RELATED APPLICATION DATA

This application is a national stage application under 35 U.S.C. 371 of PCT Application No. PCT/US2018/031132, filed May 4, 2018, which designated the United States, which PCT application claims the benefit of and priority under 35 U.S.C. § 119(e) to U.S. Patent Application No. 62/501,423, filed May 4, 2017, entitled "METHOD TO KEEP THE EXCITATION LIGHT SHEET IN FOCUS IN SELECTIVE PLANE ILLUMINATION MICROSCOPY," each of which are incorporated herein by reference in their entirety.

BACKGROUND

Selective plane illumination microscopy (SPIM) has become one of the most important 3D live fluorescence imaging techniques after its reintroduction a decade ago (Huisken et al., 2004). In SPIM, an excitation light sheet is used to illuminate the sample from a direction orthogonal to the detection optical axis, so that only the sample in focus is illuminated during imaging. The confined illumination by the excitation light sheet not only gives SPIM the advanced 3D live imaging ability, but also reduces the photodamage and photobleaching significantly at the same time (Keller et al., 2008; Wu et al., 2011; Planchon et al., 2011; Chen et al., 2014).

In theory, the 3D imaging ability of SPIM is only determined by the intensity profile of the excitation light sheet used to illuminate the sample with a given detection Numerical Aperture (NA). Nevertheless, it also relies on how well the excitation light sheet is placed in focus in practice, as both the 3D spatial resolution and the optical sectioning ability of SPIM decay quickly when the illumination light sheet deviates from the detection focal plane (Gao et al., 2014, 2015). The requirement is particularly critical for SPIM techniques using submicron thick light sheets and high detection NA to achieve submicron axial resolutions because of the thin light sheet thickness and the narrow detection depth of the focus. For example, in Bessel SPIM and lattice light sheet microscopy, a half micron off focus of the excitation light from the detection focal plane is severe enough to decrease the spatial resolution and the signal to noise ratio (SNR) of the result significantly (Gao, 2015). Therefore, besides using an appropriate excitation light sheet in SPIM imaging, it is also important to keep the excitation light sheet in focus at all times to ensure the desired 3D imaging ability of SPIM.

Unfortunately, the requirement of keeping the excitation light sheet in focus is often violated in the practice of SPIM imaging. The focus drift of the detection objective, usually caused by the temperature fluctuation of the imaging system, is a major problem that leads to off-focus of the excitation light sheet in SPIM. In addition, SPIM is perhaps more sensitive to the detection focus drift for two more reasons. First, the focus drift of the detection objective couldn't be self-compensated as that in microscopes based on the epi illumination configuration because of the separated sample illumination and fluorescence detection. Second, both objectives are usually emerged in the imaging buffer, so that the temperature variation of the imaging system often projects to the focus drift of both objectives immediately. The problem is especially disturbing when the imaging buffer needs to be heated upon the requirement of the specimen to be imaged. Therefore, a solution is required to keep the excitation light sheet in focus in SPIM live imaging, in which one essential requirement is to be able to locate the axial position of the excitation light sheet in situ, so that a correction can be applied accordingly if it is off focus.

A point light source, such as a fluorescent particle, is usually required to determine the focal plane or the axial position of the excitation light sheet accurately, by which the light sheet axial position can be obtained by measuring either the intensity profile of the light sheet, the point spread function (PSF) of the microscope, or the fluorescence intensity of the point light source. However, a point light source is usually unavailable in most biological specimens. Although similar methods may still be applied in SPIM using sharp features of the sample structure, such as punctate and filament structures, the results are inaccurate due to the coupling of the unknown sample structure. Furthermore, appropriate sharp features are still rare in most biological specimens and it is difficult to embed the sample feature selection process into an automatic process. For the reasons above, many methods developed to correct the focus drift in live microscopy, not specifically for SPIM, are based on image analysis without requiring specific sample features. The common basis of these methods is that the collected images contain higher contrast and more fine details of the sample when the microscope is in focus (Oliva et al., 1999; Sun et al., 2004; Liu et al. 2007; Yazdanfar et al., 2008; Royer et al., 2016). However, these methods are also not accurate enough due to the coupling of the unknown sample structure into the analysis process.

To solve the problem, disclosed herein is a new software-based method to find the axial position of the excitation light sheet in SPIM on general biological specimens, by which the influence of the sample structure is suppressed. In the exemplary method, a patterned light sheet is generated to illuminate the specimen at a fixed plane and a widefield 3D image stack of the fluorescence emission pattern is collected. As the high frequency signal attenuates much faster than the low frequency signal when the patterned light sheet deviates from the detection focal plane, the axial position of the excitation light sheet can be determined by identifying the image plane at which the strongest signal intensity at the modulation frequency is observed. The off focus of the excitation light sheet is corrected thereafter by resetting the offset position of either the excitation light sheet or the detection objective. (Chen et al., 2014) Herein, the mechanism of the method and evaluation of its performance using a Lattice light sheet microscope is disclosed. One exemplary embodiment proves the method provides the axial position of the excitation light sheet with ~100 nm accuracy in a few seconds.

BRIEF DESCRIPTION OF THE DRAWINGS

The exemplary embodiments of the invention will be described in detail, with reference to the following figures wherein:

FIG. 4a illustrates the image plane at which the patterned light sheet is in focus. FIG. 4b illustrates the image plane at which the patterned light sheet is one micron away from the detection focal plane. FIG. 4c illustrates the 2D Fourier transform of the image plane in a. FIG. 4d illustrates the 2D Fourier transform of the image plane in b. FIG. 4e illustrates the intensity of the crossline at $k_y=0$ of the 2D Fourier transform of all image planes. FIG. 4f illustrates the relative intensity of the modulated DC component to the non-modulated DC component at different image planes in accordance with an exemplary embodiment.

FIG. 5a illustrates the drift of the excitation light sheet according to the detection focal plane in ~12 hours. FIGS. 5b and 5c illustrates the locating of the the axial position of the excitation light sheet at the first hour and the tenth hour time points using the exemplary technique presented herein. FIG. 5e illustrates the comparison of the same two image planes at the above two time points where the light sheet is in focus and off focus due to the uncorrected focus drift according to one exemplary embodiment.

DETAILED DESCRIPTION

Figure 1:
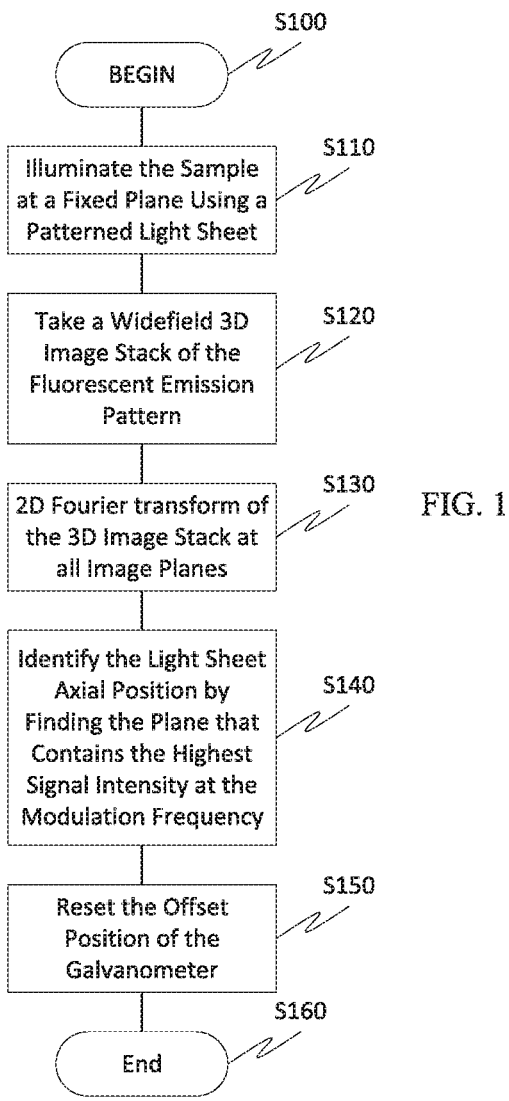
FIG. 1 outlines an exemplary method for determining an axial position of the excitation light sheet according to one exemplary embodiment.
Figure 2:
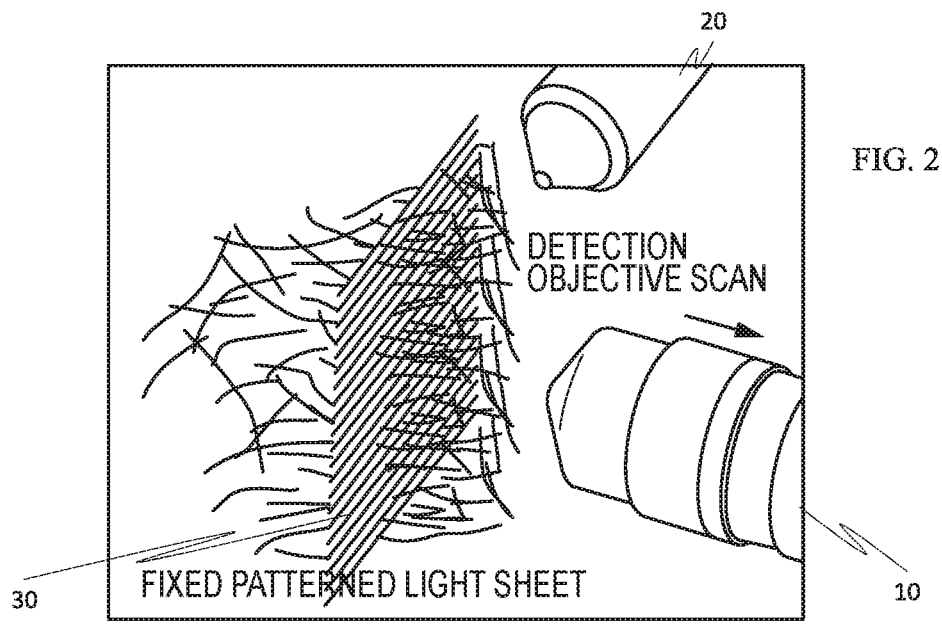
FIG. 2 illustrates an exemplary configuration of the light sheet, an excitation objective and a detection objective according to one embodiment.
Figure 3:
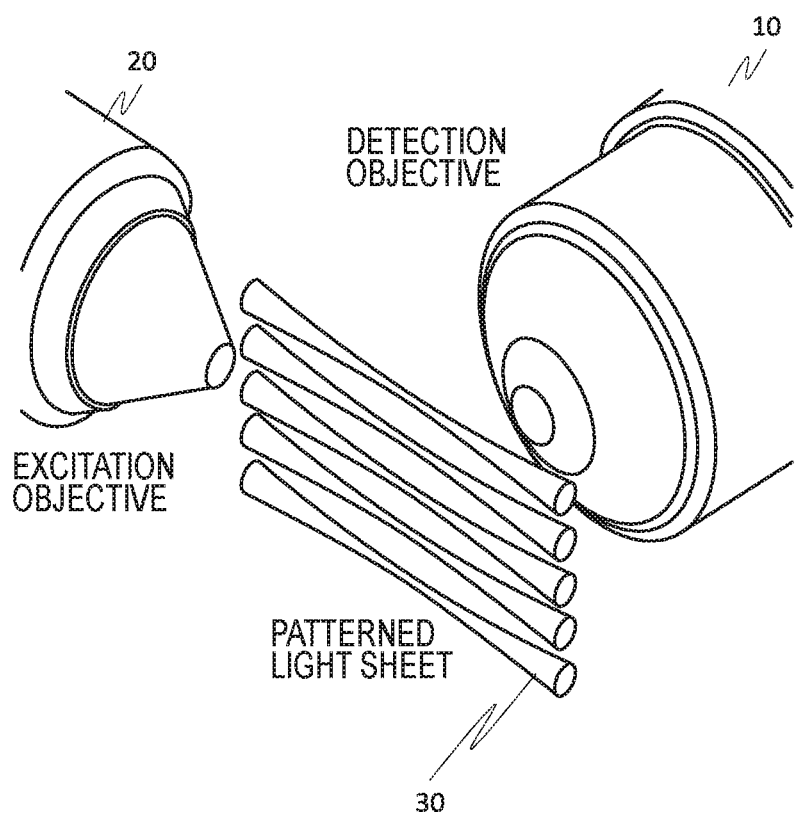
FIG. 3 illustrates another exemplary configuration of the light sheet, an excitation objective and a detection objective according to one embodiment.
Figure 6:
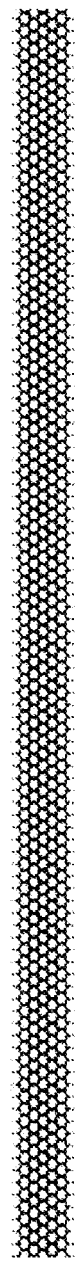
FIG. 6 illustrates an XZ view of hex patterned light sheet for autofocus.

FIG. 1 outlines one exemplary operation procedure of the proposed method that can be used with the structures illustrated in FIGS. 2-3 or comparable structures/configurations. For example, FIGS. 2-3 illustrate a detection objective 10, excitation objective 20, and light sheet 30. The detection objective can be connected to other optical device(s) not shown and one or more image sensors. The excitation objection can be, for example, 0.6 NA 4 mmWD Special Optics, or other well known excitation objective. Additionally, the patterned light sheet can be as illustrated in FIG. 6, which shows XZ view of hex patterned light sheet for autofocus. However, other patterned light sheets can also be used.

In particular, control begins in step S100 and continues to step S110. In step S110, a sample is illuminated at a fixed plane using a patterned light sheet. A patterned light sheet is parked at a fixed sample plane, while a 3D widefield image stack of the fluorescence emission pattern is collected and used to find the axial position of the excitation light sheet. More particularly, in step S120, a widefield 3D image stack of the fluorescent emission pattern is taken and stored. Next, in step S130, a 2D Fourier transform of the 3D image stack at all image planes is performed by a computing device and associated image processing software, storage/memory (not shown). Control then continues to step S140.

In step S140, the light sheet axial position is identified by finding the plane which contains the highest signal intensity at the modulation frequency. Next, in step S150, the offset position of the galvanometer is reset with control continuing to step S160 where the control sequence ends.

Figure 4:
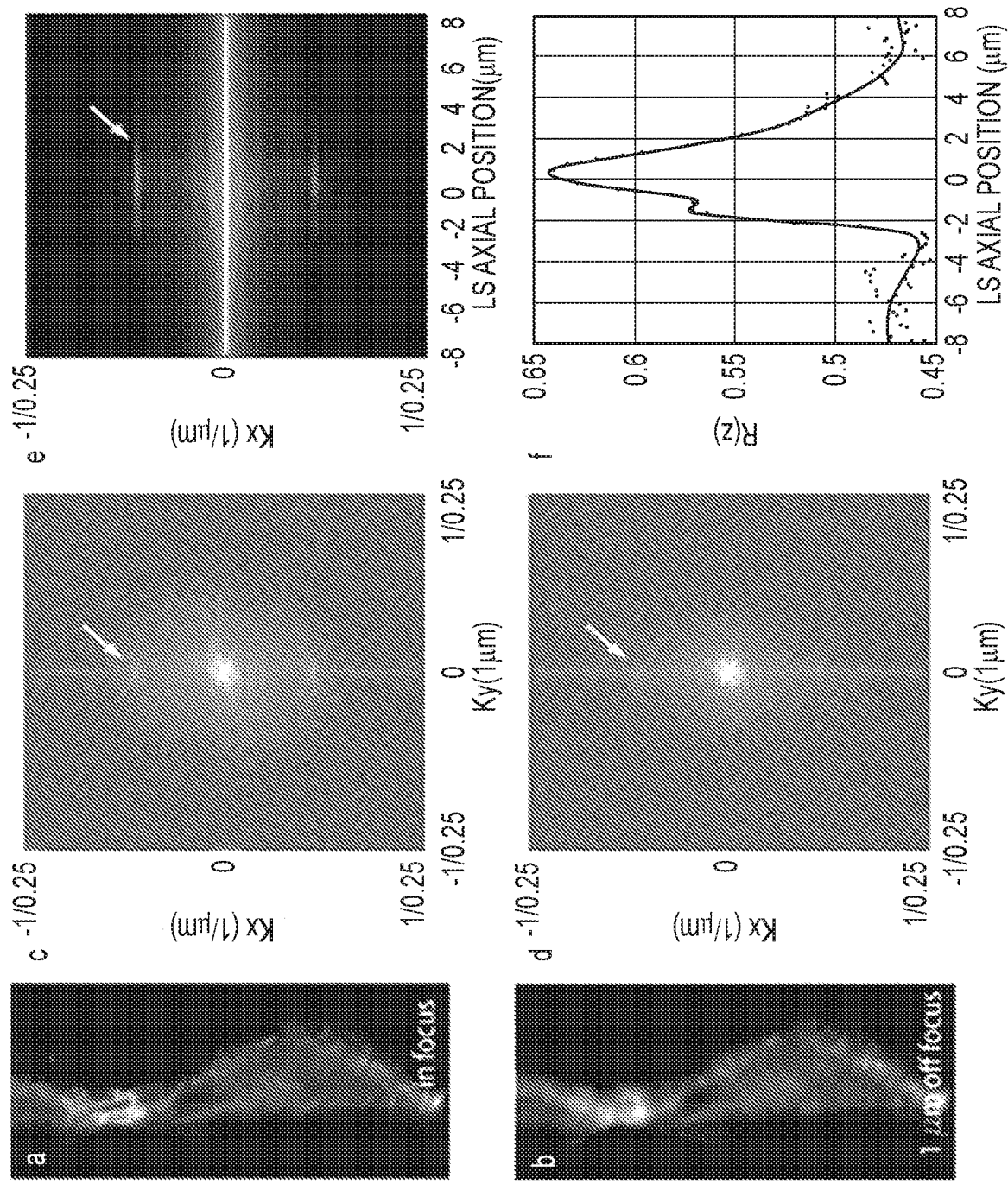
FIGS. 4a-4f illustrate the axial position of the excitation light sheet determined by identifying the image plane which contains the strongest signal intensity at the modulation frequency.

FIG. 4. shows how the axial position of the excitation light sheet is determined by identifying the image plane contains the strongest signal intensity at the modulation frequency. FIG. 4a shows the image plane at which the patterned light sheet is in focus. FIG. 4b shows the image plane at which the patterned light sheet is one micron away from the detection focal plane. FIG. 4c shows the 2D Fourier transform of the image plane in FIG. 4a. FIG. 4d shows the 2D Fourier transform of the image plane in FIG. 4b. FIG. 4e shows the intensity of the crossline at $k_y=0$ of the 2D Fourier transform of all image planes. FIG. 4f shows the relative intensity of the modulated DC component to the non-modulated DC component at different image planes. The ratio reaches the maximum when the light sheet is in focus. (A gamma value of 0.1 is optionally applied in FIGS. 4c-e to enhance the visibility of the modulation signal).

Figure 5:
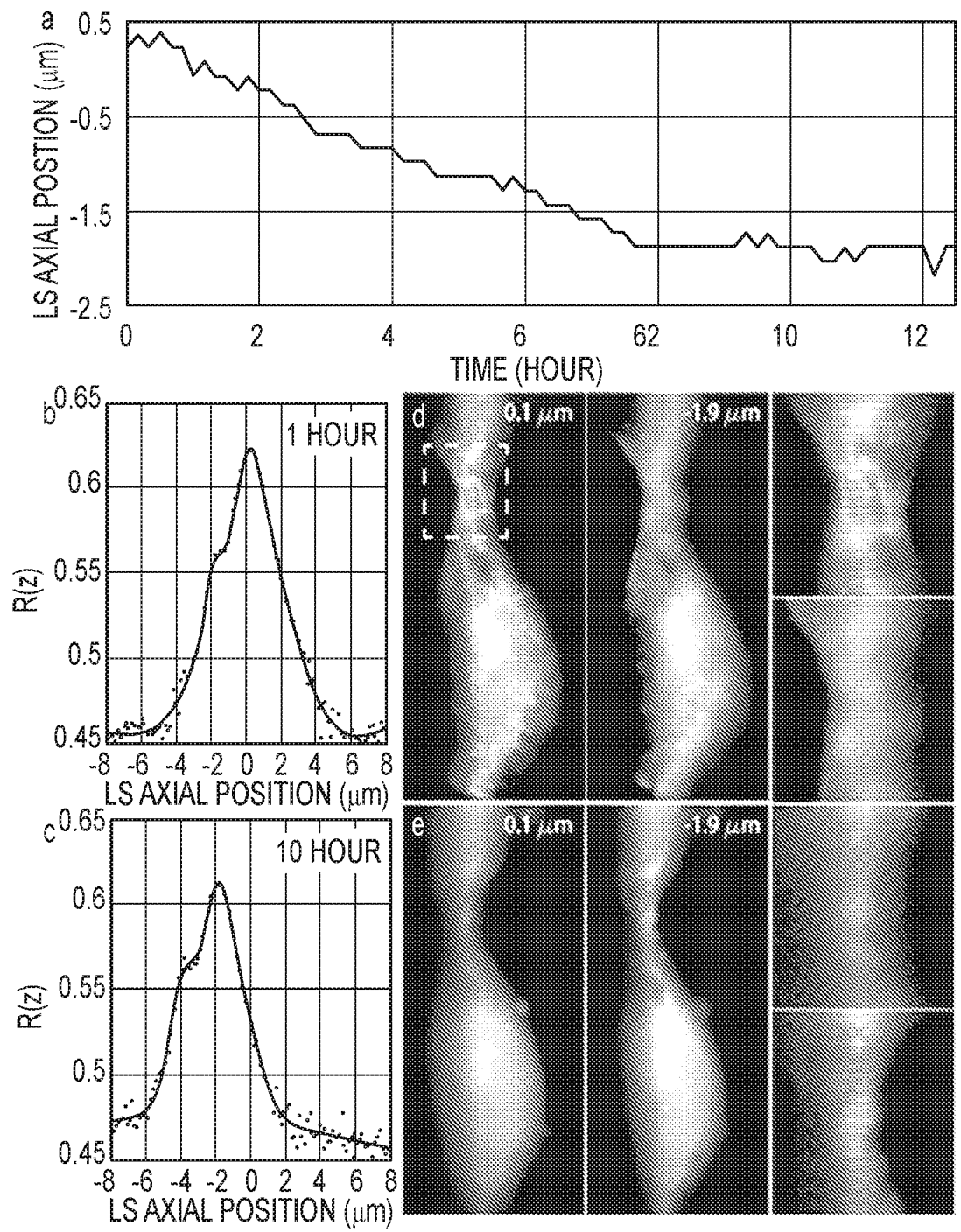
FIGS. 5a-5e illustrate monitoring the focusing stability of a lattice light sheet microscope using one exemplary embodiment.

FIG. 5 shows monitoring the focusing stability of a lattice light sheet microscope using the presented method. FIG. 5a shows the drift of the excitation light sheet according to the detection focal plane in ~12 hours. FIGS. 5b-c illustrate the locating of the axial position of the excitation light sheet at the first hour and the tenth hour time points using the presented exemplary method. FIG. 5d-e show the comparison of the same two image planes at the above two time points where the light sheet is in focus (FIG. 5d) and off focus (FIG. 5e) due to the uncorrected focus drift.

FIG. 1, as discussed above, outlines the exemplary method in overview for determining the axial position of the excitation light sheet. More specifically, a patterned excitation light sheet which contains a specific modulation frequency is parked at a fixed sample plane, while the detection objective is scanned for a few micron distance at a fixed step size to take a widefield 3D image stack of the fluorescence emission pattern. Next, a 2D Fourier transform is applied to the acquired 3D image stack plane by plane. The ratio between the modulated DC component produced by the patterned light sheet and the original DC component at each image plane is calculated to determine the axial position of the excitation light sheet. The excitation light sheet is in focus at the image plane where the maximal ratio is observed, and the influence of the sample structure is nearly eliminated due to the dividing operation. Finally, the off focus of the excitation light sheet is corrected by resetting the offset position of either the excitation light sheet or the detection objective. The same operation can be repeated periodically to keep the excitation light sheet in focus for a longer period of time.

The theory behind the method can be understood as follows. The patterned light sheet creates a fluorescence emission pattern that contains a specific spatial frequency in the modulation direction, in which the relative intensity of the modulated signal at the modulation frequency to the non-modulated signal is mainly determined by the illumination pattern. During the acquiring process of the 3D widefield image stack of the fluorescence emission pattern, the emission pattern is focused and defocused as the detection focal plane is scanned across the excited sample plane. Because the high frequency signal attenuates faster than the low frequency signal in widefield detection when the emission pattern becomes off focus, the ratio between the modulated signal and the non-modulated signal is the maximum when the light sheet is in focus.

The collected 3D image stack is the convolution of the microscope PSF (Point Spread Function) and the produced fluorescence emission pattern. The relationship can be expressed as $D(r)=H(r)\otimes E(r)$, in which $D(r)$ is the recorded image, $H(r)$ is the PSF (Point Spread Function) of the microscope, $E(r)$ is the fluorescence emission pattern, and r denotes the spatial coordinates (x, y, z) in real space. Meanwhile, the fluorescence emission pattern can be described as $E(r)=S(r)I(r)$, where $S(r)$ represents the fluorescent labeled specimen, and $I(r)$ is the intensity profile of the patterned light sheet parked on the specimen.

In SPIM, the intensity profile of a patterned light sheet can be described as the sum of multiple modulation harmonics:

$$I(r) = \sum_m I_m(z)\exp(i2\pi f_m x + i\varphi_m) \quad (1)$$

where $I_m(z)$, $f_m$ and $\varphi_m$ are the intensity, frequency and phase of each harmonic, respectively, which are determined by how the patterned light sheet is generated. By substituting I(r) with Eq. 1, it can be obtained that $$D(r) = \sum_m H(r) \otimes (S(r)I_m(z)\exp(i2\pi f_m x + i\varphi_m)) \quad (2)$$

$$D(r_{xy}, z) = \int_{-\infty}^{+\infty} \sum_m H(r_{xy}, z-\tau) \otimes (S(r_{xy}, \tau)I_m(\tau)\exp(i2\pi f_m x + i\varphi_m))d\tau \quad (3)$$

Therefore, the 2D Fourier transform of each image plane takes the form $$\tilde{D}(k_{xy}, z) = \int_{-\infty}^{+\infty} \sum_m O(k_{xy}, z-\tau)(\tilde{S}(k_x - f_m, k_y, \tau)I_m(\tau)\exp(i\varphi_m))d\tau \quad (4)$$

In which $O(k_{xy},z)$ is the optical transfer function of $H(r_{xy},z)$, and $k_{xy}$ defines the lateral coordinate in frequency space. As a result, the ratio between the modulated DC component by the $m^{th}$ harmonic and non-modulated DC component at each image plane is given by $$R(z) = \frac{|\tilde{D}(f_m, 0, z)|}{|\tilde{D}(0, 0, z)|} \approx \frac{\int_{-\infty}^{+\infty}|O(f_m, 0, z-\tau)\tilde{S}(0, 0, \tau)I_m(\tau)|d\tau}{\int_{-\infty}^{+\infty}|O(0, 0, z-\tau)\tilde{S}(0, 0, \tau)I_0(\tau)|d\tau} \quad (5)$$

As long as the sample structure is roughly uniform, the equation can be approximately simplified as $$\frac{\int_{-\infty}^{+\infty}|O(f_m, 0, z-\tau)I_m(\tau)|d\tau}{\int_{-\infty}^{+\infty}|O(0, 0, z-\tau)I_0(\tau)|d\tau} \quad (6)$$

Obviously, the ratio R(z) reaches the maximum when the patterned light sheet is in focus, because O(0,0,z) is a constant, and both $O(f_m,0,z)$ and $I_m(z)$ are the maximal at z=0.

The performance of the exemplary method has been evaluated by imaging fixed HeLa cells labeled with Vybrant CM-DiI on a lattice light sheet microscope. In lattice light sheet microscopy, a coherent Bessel beam array, which contains several modulation harmonics, is either dithered to illuminate the sample in the sheet scan mode, or scanned in discrete steps to illuminate the sample in the structured illumination mode.

At first, a coherent Bessel beam array generated with a 0.55 $NA_{od}$, 0.5 $NA_{id}$ annulus was parked at an arbitrary plane of the selected cell. The excitation objective was scanned for a 20 μm distance at a 150 nm step size to collect a 3D image stack. FIGS. 3(a) and 3(b) show the selected image plane where the patterned light sheet is in focus and one micron off focus, respectively. Next, 2D Fourier transform was applied to each image plane. FIGS. 3(c) and 3(d) show the corresponding 2D Fourier transform of the selected image plane in FIGS. 3(a) and 3(b). It can be observed clearly in both real space and frequency space that the modulation signal is much stronger when the light sheet is in focus. The ratio R(z) was calculated and plotted against the axial position of the image plane as shown in FIGS. 3(e) and 3(f). As expected, the maximal modulation intensity was observed when the excitation light sheet is in focus.

Next, the long term focusing stability of the microscope on the same cell was determined by repeating the same procedure described above every 10 minutes for ~12 hours. The results show that the light sheet drifted about ~2.5 μm according to the detection focal plane during the monitoring period (FIG. 5(a)), which is likely due to the temperature variation of the environment, despite the heating system of the microscope was running continuously. FIGS. 5(b) and 5(c) show the relative modulation intensity R(z) of the collected 3D image stack at the first hour and the tenth hour, by which the axial position of the excitation light sheet can be located and the drifting can be observed clearly. FIGS. 5(d) and 5(e) show that the imaging quality degraded quickly if the off focus of the excitation light sheet is not corrected.

One exemplary embodiment provides a method to find the axial position of the excitation light sheet in SPIM on general biological specimens so that a correction (for example via feedback) can be applied based on the result to keep the light sheet in focus. Description has been provided of a mechanism for the method and confirmed its ability on a lattice light sheet microscope by imaging HeLa cells labeling cell membrane. The exemplary method has several major advantages. First, the method can be software based and it can be implemented in an automatic process easily. Second, it can be applied to biological specimens without requiring special features, so that the method is applicable on most biological specimens. Third, it only requires dozens of 2D images to locate the axial position of the excitation light sheet, which isn't a big problem as the excitation light is highly confined in SPIM. It not only returns the result in seconds but also avoids the waste of the limited photon budget.

Besides the lattice light sheet microscopy technique used to demonstrate the method, the method can be implemented in any other SPIM technique that is capable of creating a patterned light sheet, such as the SPIM techniques that create the excitation light sheet using a scanning beam or beam array (Keller et al., 2008, 2010; Planchon et al., 2011; Gao et al., 2012). Additionally, although the modulation frequency of the patterned light sheet is not critical, the method works better when the modulation frequency is half of that of the detection lateral diffraction limit, at which the widefield detection PSF has the best axial resolution, so that the variation of the modulation signal intensity is the most sensitive to the defocusing of the patterned light sheet. Finally, the described method assumes that the labeled sample structure is roughly uniform. Therefore, it could fail when the sample is only sparsely labeled, e.g., the sample is a fluorescent particle. Fortunately, such situation is rare in most biological specimens, and other methods developed previously can be used instead to find the excitation light sheet.

Exemplary aspects are directed toward:

A method to automatically focus a light sheet in a single plane illumination microscopy device comprising:

illuminating a sample at a fixed plane using a patterned light sheet;

obtaining an image stack comprising a plurality of images of an emission pattern;

performing a 2D transform of the image stack at a plurality of image planes;

determining which of the plurality of image planes contains a highest signal intensity at a modulation frequency; and identifying and outputting a light sheet axial position.

Any one or more of the above aspects, further comprising measuring an off focus distance/axial position of the patterned light sheet in SPIM.

Any one or more of the above aspects, wherein the patterned light sheet is created and used to illuminate the sample and a generated fluorescent emission pattern is imaged at a plurality of different planes in which the distance between an imaging objective and the light sheet varies, and information from the plurality of images is used to determine the off focus distance/axial position of the light sheet.

Any one or more of the above aspects, wherein a modulation depth of the plurality of images is compared to find the position of the light sheet.

Any one or more of the above aspects, wherein a maximum modulation depth is determined by comparing a signal intensity at the modulation frequency with a non-modulated DC signal intensity in frequency space.

Any one or more of the above aspects, wherein the patterned light sheet is a one-dimensional array of illuminated beams.

Any one or more of the above aspects, wherein the patterned light sheet is a one-dimensional array of Bessel beams.

Any one or more of the above aspects, wherein the patterned light sheet is an optical lattice.

Any one or more of the above aspects, wherein the patterned light sheet is a two-dimensional array of illuminated beams or an optical lattice with components in two directions.

Any one or more of the above aspects, wherein the determining is based on a modulation depth in both directions.

A system to automatically focus a light sheet in a single plane illumination microscopy device comprising:

a patterned light sheet that illuminates a sample at a fixed plane;

an image processor and image capturing device that obtains an image stack comprising a plurality of images of an emission pattern;

a processor and associated memory that:

perform a 2D transform of the image stack at a plurality of image planes;

determine which of the plurality of image planes contains a highest signal intensity at a modulation frequency; and identify and output a light sheet axial position.

Any one or more of the above aspects, further comprising measuring an off focus distance/axial position of the patterned light sheet in SPIM.

Any one or more of the above aspects, wherein the patterned light sheet is created and used to illuminate the sample and a generated fluorescent emission pattern is imaged at a plurality of different planes in which the distance between an imaging objective and the light sheet varies, and information from the plurality of images is used to determine the off focus distance/axial position of the light sheet.

Any one or more of the above aspects, wherein a modulation depth of the plurality of images is compared to find the position of the light sheet.

Any one or more of the above aspects, wherein a maximum modulation depth is determined by comparing a signal intensity at the modulation frequency with a non-modulated DC signal intensity in frequency space.

Any one or more of the above aspects, wherein the patterned light sheet is a one-dimensional array of illuminated beams.

Any one or more of the above aspects, wherein the patterned light sheet is:

a one-dimensional array of Bessel beams, an optical lattice, or a two-dimensional array of illuminated beams or an optical lattice with components in two directions.

Any one or more of the above aspects, wherein the determining is based on a modulation depth in both directions.

A system that corrects the off focus of the excitation light sheet in SPIM by controlling a position offset of either or both of an excitation light sheet and/or a detection objective based on a acquired light sheet off focus distance determined by:

illuminating a sample at a fixed plane using a patterned light sheet;

obtaining an image stack comprising a plurality of images of an emission pattern;

performing a 2D transform of the image stack at a plurality of image planes;

determining which of the plurality of image planes contains a highest signal intensity at a modulation frequency; and identifying and outputting a light sheet axial position.

A computer-readable information storage media having stored thereon instructions, that when executed by one or more processors, cause to be performed a method to automatically focus a light sheet in a single plane illumination microscopy device comprising:

illuminating a sample at a fixed plane using a patterned light sheet;

obtaining an image stack comprising a plurality of images of an emission pattern;

performing a 2D transform of the image stack at a plurality of image planes;

determining which of the plurality of image planes contains a highest signal intensity at a modulation frequency; and identifying and outputting a light sheet axial position.

A system to automatically focus a light sheet in a single plane illumination microscopy device comprising:

means for illuminating a sample at a fixed plane using a patterned light sheet;

means for obtaining an image stack comprising a plurality of images of an emission pattern;

means for performing a 2D transform of the image stack at a plurality of image planes;

means for determining which of the plurality of image planes contains a highest signal intensity at a modulation frequency; and means for identifying and outputting a light sheet axial position.

The exemplary techniques illustrated herein are not limited to the specifically illustrated embodiments but can also be utilized with the other exemplary embodiments and each described feature is individually and separately claimable.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a microscope or microscope system, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer, microscope, imaging or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The systems, methods and protocols illustrated herein can be readily implemented in hardware and/or software using any known or later developed systems or structures, devices and/or software by those of ordinary skill in the applicable art from the functional description provided herein and with a general basic knowledge of the computer and imaging arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, imaging system, microscopy imaging system, or the like. In these instances, the systems and methods can be implemented as program embedded on personal computer such as an applet, JAVA® or CGI script, as a resource residing on a server or computer workstation, as a routine embedded in a dedicated imaging system or system component, or the like. The system can also be implemented by physically incorporating the system and/or method into a software and/or hardware system, such as the hardware and software systems of an imaging system or microscope system.

Furthermore, the disclosed control methods may be readily implemented in software using object or object-oriented software development environments that provide portable source code that can be used on a variety of computer or workstation platforms. Alternatively, the disclosed control methods may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

It is therefore apparent that there has been provided, in accordance with various embodiments an improvement to selective plane illumination microscopy. While aspects have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

REFERENCES (ALL OF WHICH ARE INCORPORATED HEREIN BY REFERENCE IN THEIR ENTIRETY)

Chen, B. C. et al. (2014) Lattice light-sheet microscopy: imaging molecules to embryos at high spatiotemporal resolution. Science 346, 1257998.

Gao, L. et al. (2012) Noninvasive imaging beyond the diffraction limit of 3D dynamics in thickly fluorescent specimens. Cell 151, 1370-1385.

Gao, L., Chen, B. C., Shao, L. & Betzig, E. (2014) 3D live fluorescence imaging of cellular dynamics using Bessel beam plane illumination microscopy. Nat. Protoc. 9, 1083-1101.

Gao, L. (2015) Optimization of the excitation light sheet in selective plane illumination microscopy. Biomed. Opt. Express 6, 881-890.

Huisken, J., Swoger, J., Del Bene, F., Wittbrodt, J. & Stelzer, E. H. K. (2004) Optical sectioning deep inside live embryos by selective plane illumination microscopy. Science 305, 1007-1009.

Keller, P. J., Schmidt, A. D., Wittbrodt, J. & Stelzer, E. H. K. (2008) Reconstruction of zebrafish early embryonic development by scanned light sheet microscopy. Science 322, 1065-1069.

Keller, P. J., Schmide, A. D., Santella, A., Khairy, K., Bao, Z., Wittbrodt, J. & Stelzer, E. H. K. (2010) Fast, high-contrast imaging of animal development with scanned light sheet-based structured-illumination microscopy. Nat. Methods. 7, 637-642.

Liu, X. Y., Wang, W. H. & Sun, Y. (2007) Dynamic evaluation of autofocusing for automated microscopic analysis of blood smear and pap smear, J. Microsc. 227, 15-23.

Oliva, M. A., Bravo-Zanoguera, M. & Price, J. H. (1999) Filtering out contrast reversals for microscopy autofocus, Appl. Opt. 38, 638-646.

Planchon, T. A., Gao, L., Milkie, D. E., Davidson, M. W., Galbraith, J. A., Galbraith, C. G. & Betzig, E. (2011)

Rapid three-dimensional isotropic imaging of living cells using Bessel beam plane illumination, Nat. Methods. 8, 417-423.

Royer, L. A., Lemon, W. C., Chhetri, R. K., Wan Y., Coleman, M., Myers, E. W. & Keller, P. J. (2016) Adaptive light-sheet microscopy for long-term, high-resolution imaging in living organisms, Nature Biotechnology 34, 1267-1278.

Sun, Y., Duthaler, S. & Nelson, B. J. (2004) Autofocusing in computer microscopy: Selecting the optimal focus algorithm, Microsc. Res. Tech. 65, 139-149.

Wu, Y. et al. (2011) Inverted selective plane illumination microscopy (iSPIM) enables coupled cell identity lineaging and neurodevelopmental imaging in Caenorhabditis elegans. Proc. Natl Acad. Sci. USA 108, 17708-17713.

Yazdanfar, S., Kenny, K. B., Tasimi, K., Corwin, A. D., Dixon, E. L. & Filkins, R. J. (2008) Simple and robust image-based autofocusing for digital microscopy, Opt. Express 16, 8670-8677.

The invention claimed is:

1. A method to automatically focus a light sheet in a single plane illumination microscopy device comprising:
    illuminating a sample at a fixed plane using a patterned light sheet;
    obtaining an image stack comprising a plurality of images of an emission pattern;
    performing a 2D transform of the image stack at a plurality of image planes;
    determining which of the plurality of image planes contains a highest signal intensity at a modulation frequency; and
    identifying and outputting a light sheet axial position.

2. The method of claim 1, further comprising measuring an off focus distance/axial position of the patterned light sheet in Selective Plane Illumination Microscopy (SPIM).

3. The method of claim 1, wherein the patterned light sheet is created and used to illuminate the sample and a generated fluorescent emission pattern is imaged at a plurality of different planes in which a distance between an imaging objective and the light sheet varies, and information from the plurality of images is used to determine an off focus distance/axial position of the light sheet.

4. The method of claim 1, wherein a modulation depth of the plurality of images is compared to find the position of the light sheet.

5. The method of claim 4, wherein a maximum modulation depth is determined by comparing a signal intensity at the modulation frequency with a non-modulated Direct Current (DC) signal intensity in frequency space.

6. The method of claim 3, wherein the patterned light sheet is a one-dimensional array of illuminated beams.

7. The method of claim 3, wherein the patterned light sheet is a one-dimensional array of Bessel beams.

8. The method of claim 3, wherein the patterned light sheet is an optical lattice.

9. The method of claim 3, wherein the patterned light sheet is a two-dimensional array of illuminated beams or an optical lattice with components in two directions.

10. The method of claim 9, wherein the determining is based on a modulation depth in both directions.

11. A system to automatically focus a light sheet in a single plane illumination microscopy device comprising:
    a patterned light sheet that illuminates a sample at a fixed plane;
    an image processor and image capturing device that obtains an image stack comprising a plurality of images of an emission pattern;
    a processor and associated memory that:
    perform a 2D transform of the image stack at a plurality of image planes;
    determine which of the plurality of image planes contains a highest signal intensity at a modulation frequency; and
    identify and output a light sheet axial position.

12. The system of claim 11, further comprising measuring an off focus distance/axial position of the patterned light sheet in Selective Plane Illumination Microscopy (SPIM).

13. The system of claim 11, wherein the patterned light sheet is created and used to illuminate the sample and a generated fluorescent emission pattern is imaged at a plurality of different planes in which a distance between an imaging objective and the light sheet varies, and information from the plurality of images is used to determine an off focus distance/axial position of the light sheet.

14. The system of claim 11, wherein a modulation depth of the plurality of images is compared to find the position of the light sheet.

15. The system of claim 14, wherein a maximum modulation depth is determined by comparing a signal intensity at the modulation frequency with a non-modulated direct current (DC) signal intensity in frequency space.

16. The system of claim 13, wherein the patterned light sheet is a one-dimensional array of illuminated beams.

17. The system of claim 13, wherein the patterned light sheet is:
    a one-dimensional array of Bessel beams,
    an optical lattice, or
    a two-dimensional array of illuminated beams or an optical lattice with components in two directions.

18. The system of claim 17, wherein the determining is based on a modulation depth in both directions.

19. A system that corrects the off focus of the excitation light sheet in Selective Plane Illumination Microscopy (SPIM) by controlling a position offset of one or more of an excitation light sheet and a detection objective based on a acquired light sheet off focus distance determined by:
    illuminating a sample at a fixed plane using a patterned light sheet;
    obtaining an image stack comprising a plurality of images of an emission pattern;
    performing a 2D transform of the image stack at a plurality of image planes;
    determining which of the plurality of image planes contains a highest signal intensity at a modulation frequency; and
    identifying and outputting a light sheet axial position.

20. A non-transitory computer-readable information storage media having stored thereon instructions, that when executed by one or more processors, cause to be performed a method to automatically focus a light sheet in a single plane illumination microscopy device comprising:
    illuminating a sample at a fixed plane using a patterned light sheet;
    obtaining an image stack comprising a plurality of images of an emission pattern;
    performing a 2D transform of the image stack at a plurality of image planes;
    determining which of the plurality of image planes contains a highest signal intensity at a modulation frequency; and
    identifying and outputting a light sheet axial position.

* * * * *